Feb. 13, 1923.
S. H. COWIN.
DRIVING MECHANISM.
ORIGINAL FILED MAY 13, 1918.
1,444,952.
2 SHEETS—SHEET 2
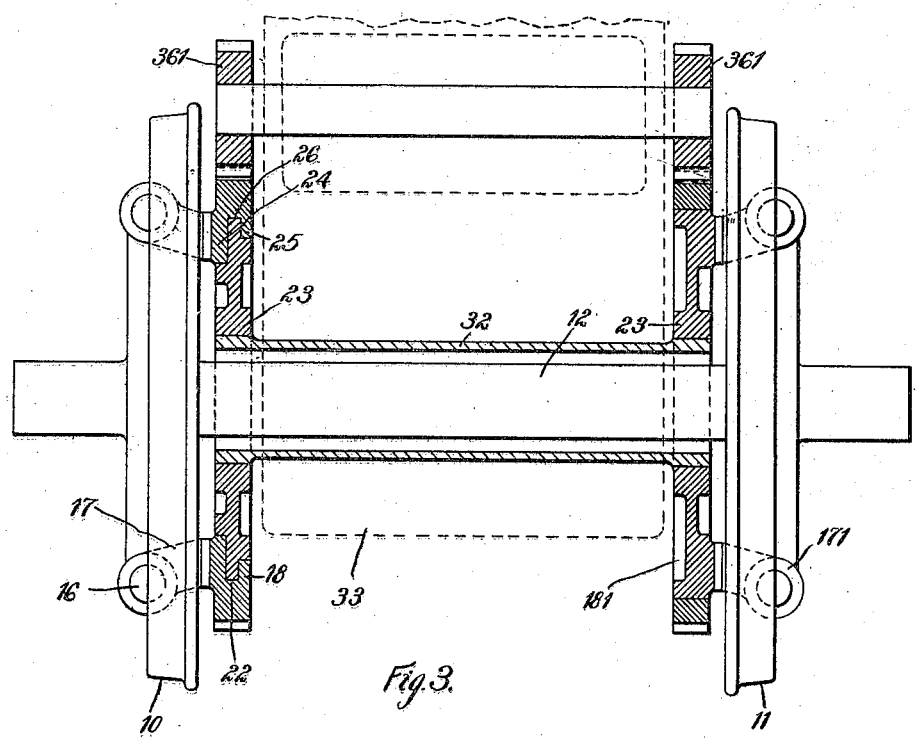
Fig. 3.
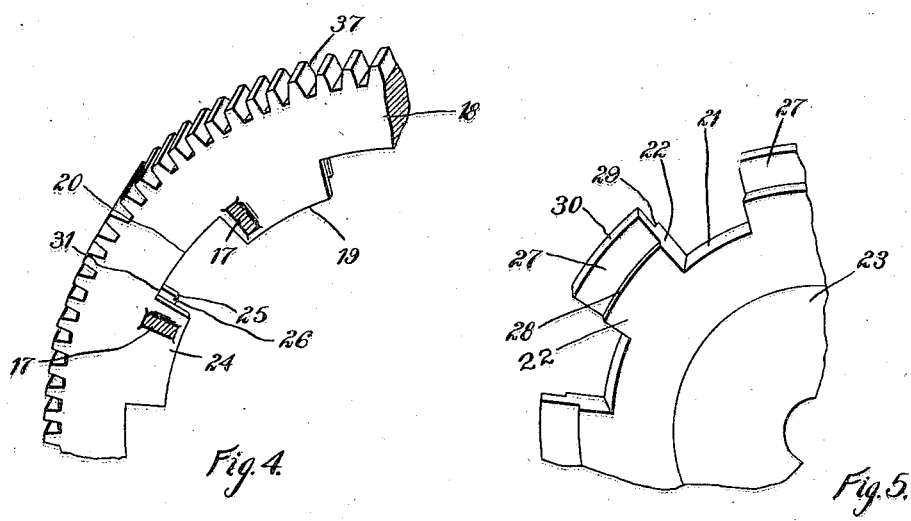
Fig. 4.
Fig. 5.
WITNESSES:
J. P. Wurmb.
E. L. Greenewald
INVENTOR
Stuart H. Cowin.
BY
Wesley G. Carr
ATTORNEY Patented Feb. 13, 1923.

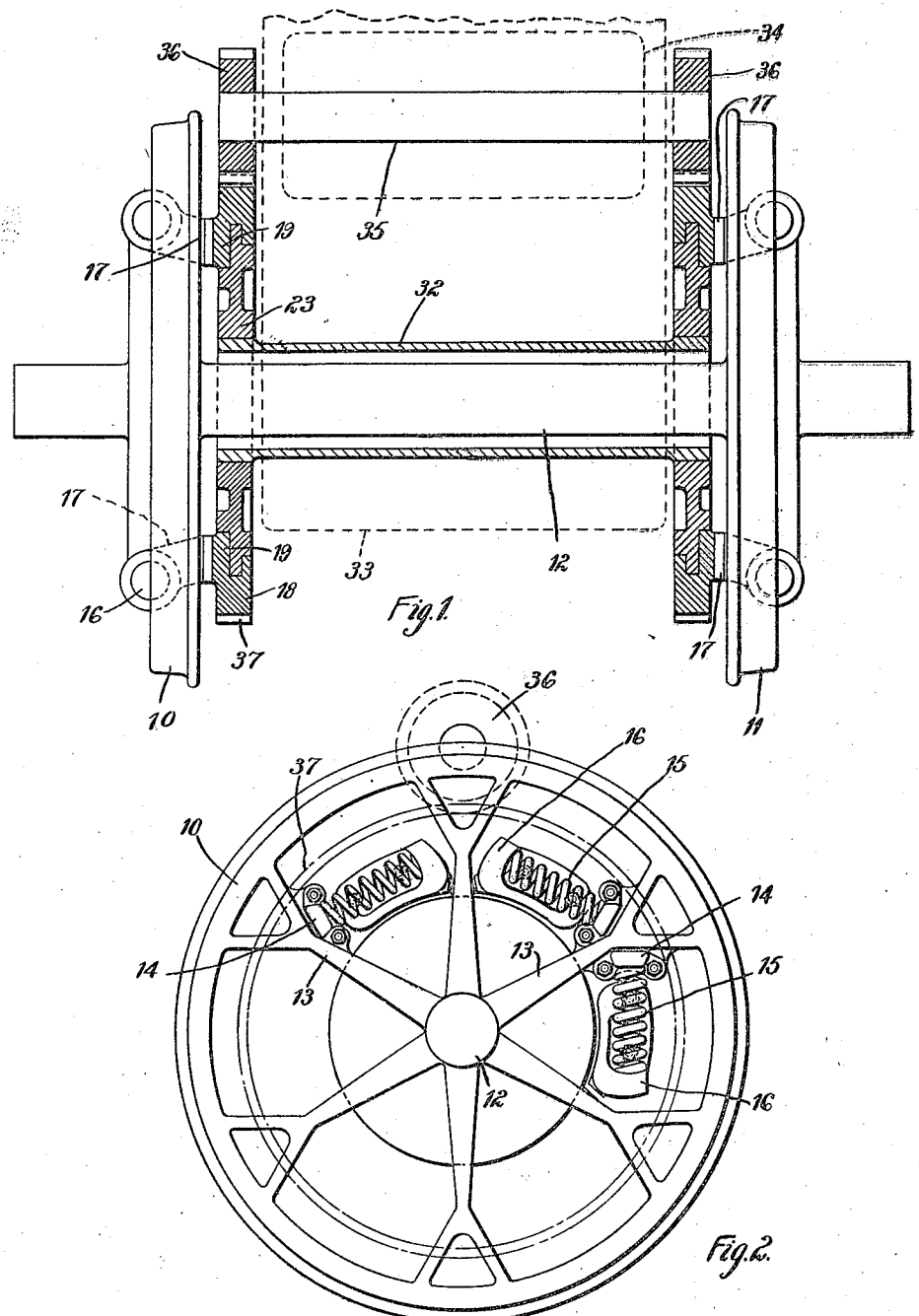

1,444,952

UNITED STATES PATENT OFFICE.

STUART H. COWIN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

DRIVING MECHANISM.

Application filed May 13, 1918, Serial No. 234,261. Renewed March 30, 1920. Serial No. 370,048.

*To all whom it may concern:*

Be it known that I, STUART H. COWIN, a citizen of the United States, and a resident of Edgewood Park, in the county of Allegheny and State of Pennsylvania, have invented a new and useful Improvement in Driving Mechanisms, of which the following is a specification.

My invention relates to driving mechanisms and more particularly to resilient driving mechanisms especially adapted for use on electric locomotives.

In driving mechanisms for electric locomotives, it is a common practice to operatively connect the electric propelling motors to the driving wheels by reduction gearings comprising pinions on opposite ends of the motor-armature shafts and co-operating flexible gears yieldingly connected to the driving wheels. The flexible gear consists of a rim connected to a hub by interfitting spaced radial lugs having helical springs in the spaces between the lugs. Laterally extending arms on the hub have supports or seats for springs that bear against seats on the driving wheels. Such an arrangement provides a balanced driving mechanism, since a substantially equal division of load is secured between the two pinions on the armature shaft.

The object of this invention is to provide a driving mechanism in which the springs of the flexible gears are eliminated and equal division of the load is obtained through the resiliency of the springs that are interposed between the driving wheels and arms integral with, and projecting laterally from, the gears adjacent the driving wheels. Either or each of the rims is freely movable on its hub. Thus, each pinion drives through a set of springs, and a substantially equal division of the load is obtained with a smaller number of springs.

The above and other objects and the novel features of the invention will be apparent from the following description, taken in connection with the drawing in which Figure 1 is an end view, partly in section, of a locomotive-driving mechanism embodying my invention; Fig. 2 is a side elevation of the same; Fig. 3 is an end elevation similar to Fig. 1, but showing a modification, and Figs. 4 and 5 are perspective views of portions of the rim and the hub, respectively.

Referring to Figs. 1 and 2, 10 and 11 designate a pair of locomotive driving wheels secured to an axle 12. The spokes 13 of the driving wheels are provided with seats 14 against which the driving effort is exerted through a series of helical springs 15 which bear against the seats 14 and also against seats 16 at the outer ends of arms 17 that project into the spaces between the spokes 13 of the driving wheels. The arms 17 extend laterally from, and are integral with, or rigidly fastened to, the toothed rims 18, each of the rims having a set of such laterally extending arms that correspond, in number and position, to the springs that bear against the seats on the driving wheel spokes.

In order that the rim 18 shall not be too weak to sustain the strains on the arms 17 and to provide easy means of assembly, said arms are mounted on wider portions of the rim formed by inwardly projecting radial lugs 19 that are separated by spaces 20, the lugs 19 and spaces 20 being of sufficient circumferential widths to interfit with the spaces 21 and radial lugs 22, respectively, on the hub member 23. The lugs 19 of the rim consist of parallel flanges 24 and 25 that are separated by spaces 26, and the lugs 22 of the hub member are provided with tongues or flanges 27 that project into the spaces 26 when the hub and rim members are assembled by a relative rotative movement after the lugs 19 and 22 have been fitted into the spaces 21 and 20, respectively. The flanges 24 and 25 may be of the same length but, as shown, are of different lengths radially, and bearing shoulders or supports 28 and 29 therefor are provided on opposite sides of the flanges 27 of the hub. The edge 30 of the flange 27 also forms a bearing support that engages the bottom 31 of the groove formed by the space 26. It will thus be seen that the bearing surfaces between the rim and the hub supporting the same are of considerable extent and of much greater area than if the sliding connection were to be had nearer the axis of the gear. The relative circumferential movement is usually not more than an inch. The hubs 23 of the gears are secured to the ends of a quill shaft 32 that surrounds the axle 12 and is mounted in bearings (not shown) in the frame of a propelling motor 33 that is located between the gears 18—23.

The propelling motor comprises an armature 34 and a shaft 35 that has pinions 36 secured to the ends thereof on opposite sides of the armature. The pinions 36 mesh with the teeth 37 on the peripheries of the rims 18 and, being connected to the same shaft, tend to exert equal driving efforts on the gears. However, under certain conditions, the load on the driving wheels 10 and 11 becomes unequal and would have an undesirable effect on the pinions, gears and motor shaft, if it were not for the interposed springs 15 and relatively movable rims 18. These operative connections between the wheels 10 and 11 and the corresponding pinions 36 serve to divide the load equally between the pinions.

In Fig. 1, the gears connected to the driving wheels are alike, which is desirable for manufacturing reasons, and also in case repairs are needed. In this structure, one of the rims is preferably secured to its hub, or provided with some means for limiting the relative circumferential movements of the hub and rim, as by means of one or more stops. In Fig. 3, all the parts are similar to those shown in Fig. 1 except the gear wheel 181 that is connected to the driving wheel 11. The arms 171 are similar, in all respects, to the arms 17 and are mounted on the gear 181 but the rim of the hub is not movable relatively to the hub, both hub and rim being rotatable as a unit. This driving mechanism also serves to divide the load equally between the pinions 361 that mesh with the gear wheels 18 and 181 but the structure shown in Fig. 1 is preferable from a manufacturing and repair standpoint.

I claim as my invention:

1. In a driving mechanism, the combination with a driving shaft and driving members mounted thereon, of a driven shaft and driven members mounted thereon, and means for operatively connecting said driving and driven members, respectively, and for maintaining a substantially equal division of load between said driving members, said means comprising gears, one of said gears having a rim movable relatively to the hub or center thereof, laterally extending arms on said movable rim, and laterally extending arms on the other of said gears.

2. In a driving mechanism, the combination with a driving shaft and driving members thereon, of a driven shaft and driven members thereon, and means for operatively connecting said driving and driven members, respectively, and for maintaining a substantially equal division of load between said driving members, said means comprising gears, one of said gears having a rim interlocked laterally with the hub thereof but movable circumferentially of the hub, laterally extending arms on said movable rim and laterally extending arms on the other of said gears.

3. A driving mechanism comprising driving members having coaxial hubs rotatable together about the same axis, and rims mounted on said hubs, one of said rims being movable circumferentially of the hub upon which it is mounted and having laterally extending arms thereon, and corresponding laterally extending arms on the other driving member.

4. A driving member comprising a two-part gear consisting of a hub and a rim having interfitting laterally interlocked portions that are relatively movable circumferentially, and laterally extending arms on the rim, said arms having spring seats thereon.

5. A two-part driving member comprising a hub and a rim, said parts having spaced radial interfitting lugs provided with bearing surfaces whereby the rim is slidably supported by the hub and is free to move circumferentially of the hub in either direction, and laterally extending arms on said rim provided with spring seats adjacent the outer ends thereof.

6. A two-part driving member comprising a hub having radial lugs provided with spaced bearing surfaces, and a rim having correspondingly spaced inwardly projecting lugs insertable between the lugs on the hub and interlocking therewith by a relative movement of rotation, said rim being supported by the bearing surfaces of said hub lugs, and laterally extending arms secured to the rim and provided with spring seats adjacent the outer ends thereof.

7. In a driving mechanism, the combination with a driving shaft and driving members mounted thereon, of a driven shaft and driven members mounted thereon, a quill shaft surrounding said driven shaft between said driven members, and means on said quill shaft for operatively connecting said driving and driven members, respectively, and for maintaining a substantially equal division of load between said driving members, said means comprising hubs secured to the quill shaft, rims carried by said hubs, one of said rims being movable circumferentially a distance relatively to the hub upon which it is mounted, laterally extending arms carried by said rims and having spring seats at their outer ends, and springs interposed between the spring seats on said arms and spring seats on said driven members.

8. In a driving mechanism, the combination with an electric motor having an armature shaft, of pinions mounted on the armature shaft on opposite sides of the armature, a driven axle, wheels on said axle, and means for operatively connecting said pinions to said wheels and for maintaining a substantially equal division of load between said pinions, said means comprising gears having rims meshing with said pinions and provided with laterally extending arms, and resilient devices between said arms and the adjacent wheels.

9. In a driving mechanism, the combination with an electric propelling motor having an armature shaft, of pinions mounted on the armature shaft on opposite sides of the armature, a driven axle, wheels on said axle, and means for operatively connecting said pinions to said wheels and for maintaining a substantially equal division of load between said pinions, said means comprising a quill shaft surrounding the axle between the wheels thereon, gears having hubs secured to said quill shaft adjacent the wheels of said axle, said gears having toothed rims meshing with said pinions and provided with laterally extending arms adjacent to the wheels of said axle, said arms having spring seats, and springs interposed between said spring seats and portions of the adjacent wheels.

10. In a driving mechanism, a gear and a wheel mounted in co-axial relationship, said gear comprising a hub portion and a relatively movable rim portion, said rim portion being provided with means independent of the hub portion for resiliently driving said wheel.

11. A driving mechanism comprising a driving shaft provided with a plurality of driving members, a driven shaft having a plurality of driven members mounted thereon, and means for transmitting energy from said driving to said driven members, said means comprising a plurality of annular members mounted upon a quill surrounding said shaft and each comprising a rim member in engagement with said driving members and resiliently connected to said driven members, one of said rim portions being freely rotatably mounted upon said quill.

12. A driving mechanism comprising a driving shaft provided with a plurality of driving members, a driven shaft having a plurality of driven members mounted thereon and a plurality of annular members each disposed to transmit energy from one of said driving to one of said driven members, one of said annular members comprising a rim member and a relatively movable hub member, said rim member being resiliently connected to one of said driven members independently of the hub member.

13. A driving connection comprising a driving shaft provided with a plurality of driving gears, a driven shaft provided with a plurality of driven members, a quill surrounding said driven shaft and provided with gears meshing with said driving gears and in resilient driving engagement with said driven members, the gears carried by the quill being relatively freely movable.

14. In a driving mechanism, the combination with a driving shaft and driving members mounted thereon, of a driven shaft and driven members mounted thereon, and means for operatively connecting said driving and said driven members, respectively, and for maintaining a substantially equal division of load between said driving members, said means comprising gears having rims, one of which is freely movable relative to the hub or center thereof, and means for resiliently connecting said rims to said driven members.

In testimony whereof, I have hereunto subscribed my name this 30th day of April, 1918.

STUART H. COWIN.